United States Patent Office 3,725,208
Patented Apr. 3, 1973

3,725,208
PROCESS FOR PURIFICATION OF ACRYLIC ACID FROM ALDEHYDES BY DISTILLATION WITH A REAGENT
Shiro Maezawa, Hiroshi Yoshikawa, Kenji Sakamoto, and Jun Fujii, Takasaki, and Makoto Hashimoto, Tokyo, Japan, assignors to Nippon Kayaku Company, Ltd., Tokyo, Japan
No Drawing. Filed Aug. 20, 1971, Ser. No. 173,646
Int. Cl. C07c 57/04
U.S. Cl. 203—8
9 Claims

ABSTRACT OF THE DISCLOSURE

A process for the removal of small amounts of aldehyde impurities from acrylic acid comprises adding to the acrylic acid minor amounts of a compound selected from the group consisting of sulfuric acid, hydrazine, phenylhydrazine, aniline, monoethanolamine, ethylene diamine and glycine, and subjecting the acrylic acid mixture to distillation.

PROCESS FOR PURIFICATION OF ACRYLIC ACID

This invention relates to a novel process for the purification of acrylic acid. More specifically, this invention relates to a novel process for the purification of acrylic acid, characterized by adding to acrylic acid containing aldehydes as impurities at least one compound selected from the group consisting of sulfuric acid, hydrazine, phenylhydrazine, aniline, monoethanolamine, ethylene diamine and glycine, and removing the aldehydes by subjecting the mixture to distillation.

Currently, acrylic acid is manufactured in large quantities at low costs by the catalytic oxidation of propylene. The acrylic acid formed by the oxidation of propylene can be converted to a high purity product by conventional purification means such as extraction or distillation. However, the purity of such product is still insufficient for use in the preparation of polymers.

For instance, in instances where polyacrylic acid is prepared from acrylic acid obtained by the oxidation of propylene, the induction period of the polymerization reaction (the period of time extending from the time when the polymerization temperature is attained to the time when the polymerization actually starts) is extraordinarily long, and the degree of the polymerization is low as compared wtih polymerization reactions carried out with other commercially available acrylic acids, such as those obtained by the hydrolysis of acrylonitrile. Further, the polymers prepared from acrylic acid obtained by the oxidation of propylene have a tendency to develop color. For these reasons, the acrylic acid formed by the oxidation of propylene cannot be used satisfactorily for preparing polymers.

As a result of our investigation to discover the cause of the above undesirable characteristcs, it has been found that the acrylic acid prepared by the oxidation of propylene contains very minor amounts of aldehydes such as acetaldehyde, acrolein, furfural and benzaldehyde, and the presence of such aldehydes has a deleterious effect on the polymerization reaction and properties of the resulting polymer.

It has also been confirmed that some of these aldehydes are formed as byproducts during the oxidation of propylene, and other aldehydes are obtained from the chemical reaction of impurities contained in the starting propylene feed.

The recovery process for acrylic acid obtained from the oxidation product of propylene involves several purification steps such as extraction and distillation. Accordingly, essentially all of the aldehydes are removed from the product acrylic acid, but very minor amounts of aldehydes remain which have an adverse effect on the polymerization reaction.

It is both difficult and costly to remove adlehydes contained in such minute amounts by physical methods. However, we have discovered an economical process for easily removing such aldehydes and which is the subject of the present invention.

In accordance with this invention, it is possible to obtain acrylic acid of high purity and in high yields which is suitable for use in polymerization reactions.

Of the compounds utilized in this invention, hydrazine usually reacts exothermally with acrylic acid to form pyrazolidone, and amines such as monoethanolamine and ethylene diamine have the properties of forming salts and aminocarboxylic acids with acrylic acid. Nevertheless, it is surprising that these compounds react predominantly with aldehydes contained in acrylic acid and can remove them from the acrylic acid.

The amounts of the above compounds utilized for removing the aldehydes in this invention may vary and are dependent upont the amounts of aldehydes present in the acrylic acid product. Since acrylic acid purified by the conventional procedures of extraction and distillation contains several hundred parts per million of the aldehyde impurities, it is preferable to add to the acrylic acid product the aforementioned compounds in amounts of from 0.1–0.5 percent by weight. In the subsequent distillation step, it is also desirable to conduct the distillation under reduced pressure in the presence of a polymerization inhibitor such as hydroquinone and hydroquinone monomethyl ether in order to prevent loss of acrylic acid by polymerization.

The present invention can be more fully understood by referring to the following examples.

EXAMPLES 1–8

The compounds of sulfuric acid, hydrazine, phenylhydrazine, aniline, monoethanolamine, ethylene diamine, glycine and a mixture of hydrazine and phenylhydrazine were each added to acrylic acid in the amount indicated in Table I. The acrylic acid contained 245 p.p.m. of aldehydes and 100 p.p.m of hydroquinone monomethyl ether as a polymerization inhibitor, and was obtained by purifying a crude acrylic acid product formed by the oxidation of propylene by conventional methods The mixture was heated at 70° C. for 3 hours and subjected to distillation under a reduced pressure of 30 mm. Hg at a vapor temperature of 60° C. The yield of purified acrylic acid obtained was 97–98 percent.

The acrylic acid obtained according to this invention was polymerized in the following manner:

2 ml. of acrylic acid prepared according to the process of this invention (containing 100 p.p.m. of hydroquinone monomethyl ether) and 10 mg. of ammonium persulfate (added in the form of 0.5 percent solution) were added to 18 ml. of water, and the mixture was polymerized at a temperature of 55° C. for 4 hours. After the completion of the polymerization, 100 ml. of water were added to dissolve the resulting polymer, and the viscosity of the solution was determined by employing a Vismetron rotary viscometer of VA–I type manufactured by Tokyo Keisoku Kabushiki Kaisha. The results are shown in Table I.

EXAMPLE 9

To acrylic acid obtained as in Examiple 1 (containing 31 p.p.m. of aldehydes) was added 0.1 percent by weight based on the weight of acrylic acid of an 80 percent aqueous solution of hydrazine, and the product was distilled in the same manner as in Example 1. The aldehydes were substantially completely removed. The resulting purified acrylic acid was polymerized in the same manner as in Example 1, and the results are shown in Table I.

EXAMPLES 10–11

For comparative purposes polymerization reactions were carried out in the same manner as in Example 1 employing in one example acrylic acid containing 245 p.p.m. of aldehydes, obtained by the oxidation of propylene and purified by conventional means, and in the other example a commercially available acrylic acid of first grade quality and almost free of aldehydes. The results of these experiments are also disclosed in Table I.

4. The process in claim 1 wherein the compound added to acrylic acid is hydrazine.

5. The process in claim 1 wherein the compound added to acrylic acid is phenyl hydrazine.

6. The process in claim 1 wherein the compound added to acrylic acid is aniline.

7. The process in claim 1 wherein the compound added to acrylic acid is monoethanolamine.

8. The process in claim 1 wherein the compound added to acrylic acid is ethylene diamine.

9. The process in claim 1 wherein the compound added to acrylic acid is glycine.

TABLE I

| Ex. No. | Compound added | Amount of compound added (wt. percent) | Aldehyde content in purified acrylic acid (p.p.m.) | Induction period of polymerization* (hours) | Viscosity of acrylic acid polymer (cp.) | Coloration in resulting polymer |
|---|---|---|---|---|---|---|
| 1 | Sulfuric acid | 0.3 | 31 | 0.7 | 50 | None observed. |
| 2 | 80% aqueous solution of hydrazine | 0.2 | 8 | 0.6 | 85 | Do. |
| 3 | Phenylhydrazine | 0.3 | 10 | 0.6 | 57 | Do. |
| 4 | Aniline | 0.5 | 70 | 0.8 | 57 | Do. |
| 5 | Monoethanolamine | 0.5 | 50 | 0.8 | 72 | Do. |
| 6 | Ethylene diamine | 0.5 | 55 | 0.8 | 55 | Do. |
| 7 | Glycine | 0.2 | 12 | 0.6 | 68 | Do. |
| 8 | {Hydrazine / Phenylhydrazine} | 0.1 / 0.2 | 9 | 0.6 | 65 | Do. |
| 9 | Hydrazine 80% aqueous solution | 0.1 | 0 | 0.5 | 138 | Do. |
| 10 | | | 245 | 3 | 25 | Coloration. |
| 11 | | | 0 | 0.5 | 50 | None observed. |

*The induction period was the period of time extending from the time when the temperature was raised to 55° C. to the time when the viscosity of the solution began to increase.

We claim:

1. A process for the purification of acrylic acid, characterized by adding to acrylic acid containing aldehydes as impurities at least one compound selected from the group consisting of hydrazine, phenylhydrazine, aniline, monoethanolamine, ethylene diamine and glycine, and removing the aldehydes by subjecting the mixture to distillation.

2. The process in claim 1 wherein the distillation is carried out at a reduced pressure.

3. The process in claim 2 wherein the distillation is carried out in the presence of a polymerization inhibitor.

References Cited

UNITED STATES PATENTS

| | | | |
|---|---|---|---|
| 3,639,466 | 2/1972 | Leichtle | 260— 526 N |
| 3,658,895 | 4/1972 | Riemann et al. | 260—562 N |
| 2,386,365 | 10/1945 | Staudinger et al. | 203—58 |

WILBUR L. BASCOMB, JR., Primary Examiner

U.S. Cl. X.R.

203—38, 29, 50, 51, 59, 61; 260—526 N, 533 N